250-203.R 56

Aug. 26, 1969 B. WALKER ET AL 3,463,925

DIGITATED PHOTOELECTRIC QUADRANT STRUCTURE FOR RADIATION TRACKING DEVICES

Filed April 6, 1967

INVENTORS
BURT WALKER
HERBERT WOLLMAN
ROBERT C CHROUCH
BY
OSTROLENK, FABER, GERB & SOFFEN
ATTORNEYS

United States Patent Office 3,463,925
Patented Aug. 26, 1969

3,463,925
DIGITATED PHOTOELECTRIC QUADRANT STRUCTURE FOR RADIATION TRACKING DEVICES

Burt Walker, Plainview, Herbert Wollman, Hollis, and Robert C. Chrouch, Bayport, N.Y., assignors to Kollsman Instruments Corporation, Elmhurst, N.Y., a corporation of New York Filed Apr. 6, 1967, Ser. No. 628,882
Int. Cl. G01j *1/20*
U.S. Cl. 250—203 8 Claims

ABSTRACT OF THE DISCLOSURE

The image of a light source to be tracked is oscillated through a predetermined excursion. This image falls on a photosensing device formed by a semi-conductor wafer having four isolated photosensitive areas therein in four quadrants of a square. A digitated electrode is applied to each of the photosensitive quadrants with the spacing between any two digitated members plus the width of one digitated member being approximately equal to the total excursion of the light source image. Each of the quadrants are then separately electrically connected to processing circuitry which drive servos which adjusts the optical axis of the tracker device until the excursion of the image will be around the adjacent corners of the four quadrants with null tracking.

This invention relates to a novel detector structure for light tracking devices and more specifically relates to a detector structure which comprises at least three adjacent photosensitive surfaces in which each of the photosensive surfaces carry respective digitated contact structures which expose alternate strip portions of their photosensitive surface. A point adjacent each of the areas then aligned with the optical axis of the tracking telescope and the image of an object being tracked is caused to oscillate with an excursion approximately equal to the width of one digitated contact element and one adjacent photosensitive surface region. Assuming that the image of the object being tracked is not aligned with the optical axis of the telescope, this oscillating image will oscillate within one of the photosensitive areas, depending upon the sense of deviation between the telescope axis and the object being tracked. This will then generate an output voltage from the particular photosensitive area receiving the oscillating image, and will have an output containing a strong fundamental component. If the image path is centered on either a contact strip or photosensitive space, then two pulses per nutation will occur so that there will be a strong second harmonic component in the cell output. By suitably processing the output signal of the complete detector, it can, therefore, be determined, due, for example, to the absence of an output signal from the other photosensitive areas, which area of the detector receives the image. This then gives rise to correction signals in the servo which tend to bring the center of oscillation of the image back to the optical axis of the telescope. Once the axis is centered, the individual photosensitive areas are so arranged with respect to the oscillating image excursion (such as the diameter of a nutated image) that each of the areas will intercept the image at their adjacent corners with this information being suitably processed to indicate tracking to null.

It will be apparent that the novel photodetector device of the invention will permit wide angle tracking and will be applicable to any desired type of tracking function such as day and night time star tracking, planet tracking and point target tracking and detection. It will be further apparent that any number of geometric patterns can be used for the configuration of the photosensitive areas described above and for the digitated form of the contact sections described above.

Accordingly, a primary object of this invention is to provide a novel detector structure for radiation sensing devices which has a wide field of view.

Another object of this invention is to provide a novel detecting structure for a tracking device which has small mass and permits the use of relatively simple processing circuits.

These and other objects of the present invention will become apparent when reading the accompanying description and drawings, in which:

FIGURE 1 schematically illustrates a tracking system of the type which could incorporate the detector structure of the present invention.

Figure 1:
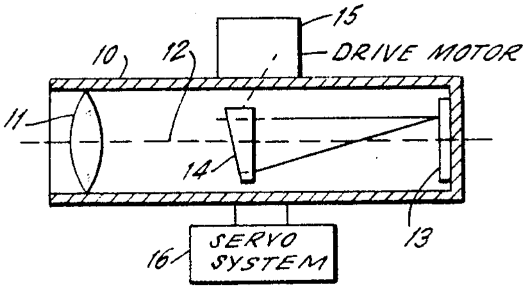
Figure 4:
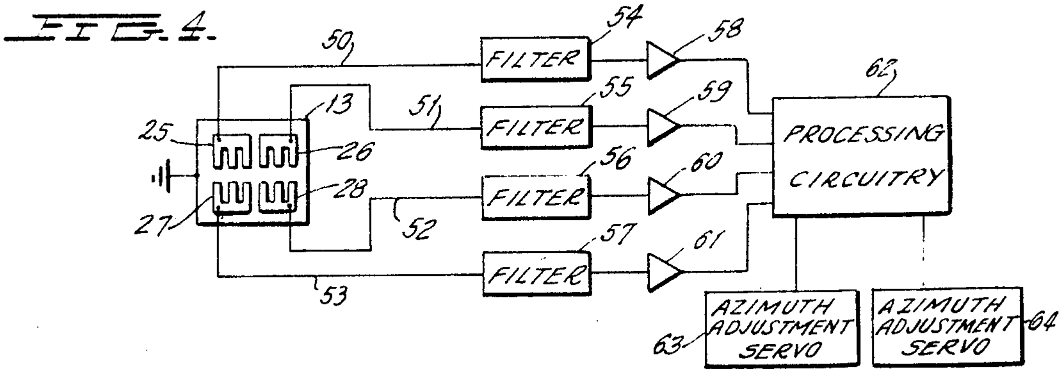
Figures 2, 3:
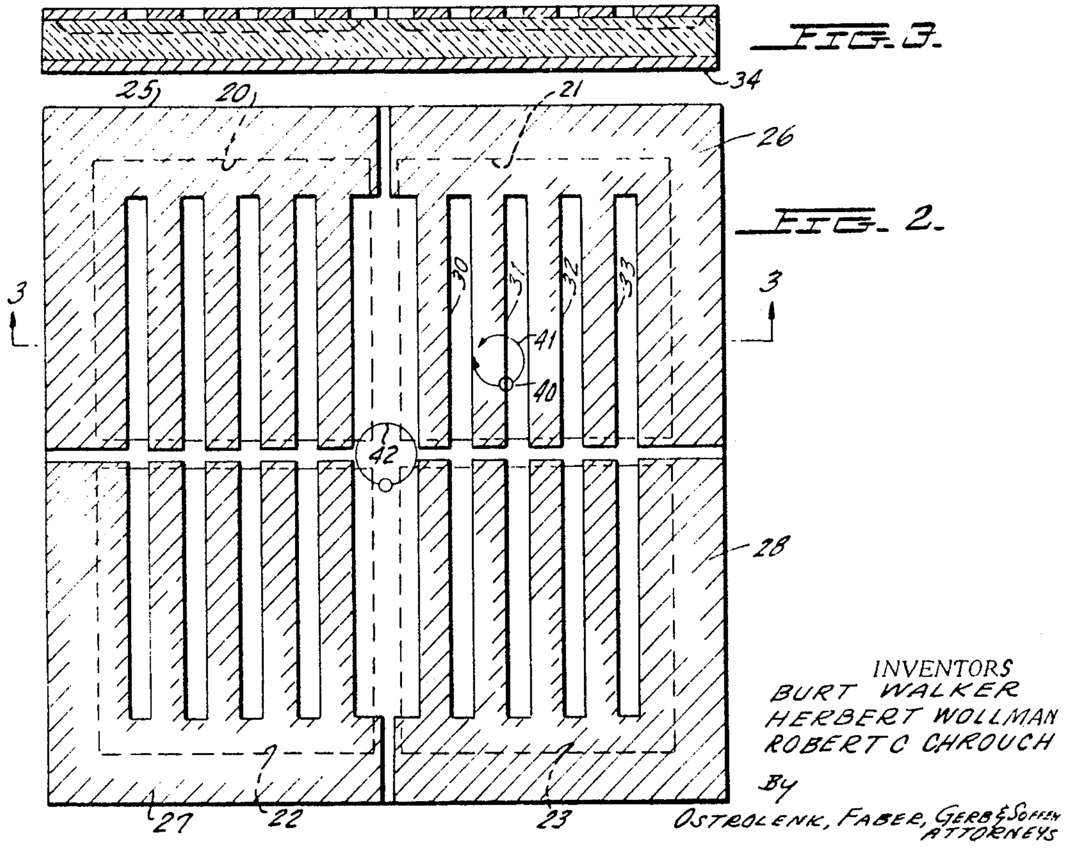
FIGURE 2 is a top plan view of the detector structure of the present invention.
FIGURE 3 is a cross-sectional view of the detector of FIGURE 2 taken across the section line 3—3 in FIGURE 2.

FIGURE 4 schematically illustrates, in diagram form, the circuit for connecting the output of the detector of FIGURES 2 and 3 to the telescope adjustment servos of FIGURE 1.

Referring first to FIGURE 1, there is illustrated in schematic fashion a tracking system which can be used for tracking stars and other radiation sources which is comprised of a telescope housing 10 having a suitable objective 11 which focuses the image of the object aligned generally along the optical axis 12 of the telescope on a detector structure 13. The light path between objective 11 and detector 13 includes an optical wedge 14 of the well-known type which is rotated about optical axis 12 by some suitable drive motor 15. Rotation of wedge 14 will cause the image focused at detector 13 to nutate about a circle of some predetermined diameter with the output current of detector 13 being appropriately processed and connected to servo system 16 which redirects the optical axis 12 in order to keep optical axis 12 pointed at some particular object which is to be tracked.

The present invention is directed to a novel structure for the detector 13 of FIGURE 1. This novel detector structure being shown in FIGURES 2 and 3.

Referring now to FIGURES 2 and 3, the detector shown therein is a multi-element photogenerating cell which has four separate and isolated quadrants which each generate output currents responsive to the impingement of radiation upon their surface.

Thus, the quadrants are in side-by-side spaced relation defining a common central region aligned with the optical axis. Each quadrant borders the central region and occupies an angularly distinct region of the total field of view.

The cell of FIGURES 2 and 3 is formed in a single monocrystalline silicon wafer of the type commonly used for solar cells and may have a thickness of 0.005 inch and a length of 0.100 inch on a side.

More particularly, the wafer is initally of the N-type conductivity and has a resistivity of approximately 10 ohm-cm. The surfaces of the wafer are suitably prepared in the well-known manner as by the provision of a suitable mask extending around the bottom of the wafer and around a peripheral edge of the upper region and in strips which cut across the center of the wafer. Thereafter, the wafer is placed in a gaseous diffusion furnace and a P-type impurity is diffused into the unmasked quadrant areas to a depth of approximately 2 microns. This will form four "planar" junctions 20, 21, 22 and 23 which are close to the upper surface of the wafer so that they can be activated by photons which reach the junctions. After diffusion, the wafers are cleaned and the upper exposed areas are suitably oxidized to provide complete surface passivation in the usual manner. Thereafter, digitated aluminum grids 25 to 28 are deposited over the quadrant regions containing junctions 21 to 23, respectively, in any desired manner with the quadrants being isolated from one another and each containing digitated strips such as strips 30, 31, 32 and 33 designated for electrode 26. Each of the strips 30 to 33 have a width of approximately 0.001 inch and a spacing from the next adjacent finger of approximately 0.001 inch to expose strips of the photosensitive surface of the wafer which can be activated by the radiation impinging upon these areas.

Separate electrode leads are then connected to each of electrodes 25 through 28 while the bottom surface of the wafer receives a suitable bottom contact 34, which can be of gold, and serves as a common electrode with electrodes 25 to 28 of the four separate photogenerating cells formed within the common wafer. It will be apparent that the above-noted process for the formation of the device of FIGURES 2 and 3 could be replaced by any other standard fabrication well known to those skilled in the art. It will further become apparent that while the preferred embodiment of the invention employs four quadrants, as in FIGURES 2 and 3, which each has four digitated fingers, a different number of elements can be used other than four quadrant elements and a different number of contact strips can be provided within each of the quadrants. Moreover, the contact strips of each quadrant could extend along non-parallel and perpendicular directions.

In operation and with the detector of FIGURES 3 and 4 connected in the position of detector 13 of FIGURE 1, if the object being tracked is removed from the optical axis of the telescope, the image thereof, which is caused to nutate by the rotating wedge 14, will fall somewhere other than at the center of the four quadrants of FIGURE 2. By way of example, FIGURE 2 illustrates an instance wherein an image 40 nutates around a path 41 in quadrant 26. In a typical application, the size of image 40 will be somewhat less than the spacing between adjacent contact strps such as strips 31 and 32 and will oscillate around a diameter 41 of about 0.002 inch with a frequency of 100 cycles per second. This will cause the generating of one output pulse for each rotation of image 40 between electrodes 26 and 34. Therefore, the output of this cell portion will contain a strong first harmonic component in its output current of the frequency of rotation of image 40. Note that if the star image 40 were centered on one of the contact fingers or on one of the spaces between contacts, there would be two pulses in each cycle so that the output current would contain a second harmonic component of the frequency of rotation of image 40. In either case, this output signal along with the lack of an output signal from any of the other three cell portions including electrodes 25, 27 and 28 carries information of the location of image 40 with respect to the center of the detector.

A null position for the image being tracked can be distinguished since, during the null, the star image 40 will circulate around the path 42 illustrated in FIGURE 2, intersecting the adjacent corner of each of junctions 20 to 23, thereby generating one output pulse per cycle in each of the cell sections. Obviously, as the circle rotation 42 drifts from this position, the processing circuit will sense the absence of an output from one or more of the quadrants and will appropriately actuate the servo mechanism system, such as servo mechanism 16 of FIGURE 16 to return the center of nutation to the star image to its null position around axis 12.

FIGURE 4 schematically illustrates processing circuitry which may be associated with the device wherein the detector 13 has four output leads 50, 51, 52 and 53 extending from electrodes 25, 26, 28 and 27, respectively. Each of these leads are connected to appropriate filter networks 54 through 57, respectively, which pass either the first or second harmonic components of the frequency of rotation of star image 40 in FIGURE 2. These signals are amplified in the respective amplifiers 58 through 61 and are then connected to an appropriate data processing circuit 62 which subsequently energizes an azimuth adjustment servo 63 and an altitude adjustment servo 64, which serve the purpose of the servo system 16 and which redirect the position of optical axis 12 in order to cause the nutation of the star image about the optical axis 12.

Although there has been described a preferred embodiment of this novel invention, many variations and modifications will now be apparent to those skilled in the art. Therefore, this invention is to be limited not by the specific disclosure herein but only by the appending claims.

The embodiments of the invention in which an exclusive privilege or property is claimed are defined as follows:

1. A radiation tracking device comprising an objective means having an optical axis, a flat image detection means disposed perpendicular to said optical axis, and an image oscillating means interposed between said objective means and said image detection means for oscillating the image of an object being tracked with respect to said image detector means; said image detector means comprising a side-by-side spaced detector array defining a common central region aligned with said optical axis and bordered by at least two separate and insulated photogenerating surface areas disposed symmetrically about said central region such that each such surface area occupies an angularly distinct region of the total field of view; the adjacent regions of said separate photogenerating surfaces spaced from one another by a distance less than the total excursion of the oscillation of said image.

2. The device of claim 1 wherein each of said separate photogenerating surfaces are connected to servo means for holding the center of oscillation of said image on said optical axis.

3. The device of claim 1 wherein each of said photogenerating surfaces have a plurality of spaced masking contacts thereon spaced from one another and having a width whereby the width of one contact and the spacing between adjacent contacts are approximately equal to the total excursion of the oscillation of said image.

4. The device as set forth in claim 3 which includes four photogenerating surface areas disposed in the quadrants of a square.

5. The device as set forth in claim 3 wherein said masking contacts of each of said photogenerating surfaces are formed in straight, parallel rows.

6. The device as set forth in claim 4 wherein said masking contacts of each of said photogenerating surfaces are formed in straight, parallel rows.

7. The device of claim 6 wherein each of said separate photogenerating surfaces are connected to servo means for holding the center of oscillation of said image on said optical axis.

8. The device as set forth in claim 3 wherein said separate photogenerating areas are formed in a common semiconductor wafer.

References Cited

UNITED STATES PATENTS

| | | | |
|---|---|---|---|
| 3,219,828 | 11/1965 | Foster | 250—203 |
| 3,293,439 | 12/1966 | Marantette et al. | 250—203 |
| 3,381,133 | 4/1968 | Barnes et al. | 250—203 |

JAMES W. LAWRENCE, Primary Examiner

C. R. CAMPBELL, Assistant Examiner

U.S. Cl. X.R.

250—209, 210